United States Patent
Palus et al.

(10) Patent No.: US 11,275,755 B2
(45) Date of Patent: Mar. 15, 2022

(54) AUTOMATICALLY CAPTURING LINEAGE DATA IN DISTRIBUTED SYSTEMS

(71) Applicant: International Business Machines Corporation, Armonk, NY (US)

(72) Inventors: Lukasz Jakub Palus, Cracow (PL); Grzegorz Piotr Szczepanik, Cracow (PL); Krzysztof Rudek, Nowy Wisnicz (PL); Michal Bodziony, Tegoborze (PL)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 16/594,410

(22) Filed: Oct. 7, 2019

(65) Prior Publication Data
US 2021/0103596 A1 Apr. 8, 2021

(51) Int. Cl.
| G06F 16/25 | (2019.01) |
| G06F 16/23 | (2019.01) |
| G06F 16/182 | (2019.01) |
| G06F 16/22 | (2019.01) |
| G06F 16/21 | (2019.01) |

(52) U.S. Cl.
CPC .......... *G06F 16/254* (2019.01); *G06F 16/182* (2019.01); *G06F 16/219* (2019.01); *G06F 16/2282* (2019.01); *G06F 16/2358* (2019.01)

(58) Field of Classification Search
CPC ....... G06F 16/254; G06F 8/427; G06F 16/214
USPC ......................................................... 707/602
See application file for complete search history.

(56) References Cited

U.S. PATENT DOCUMENTS

| 10,445,170 | B1* | 10/2019 | Subramanian | G06N 7/005 |
| 2015/0134589 | A1* | 5/2015 | Marrelli | G06F 16/258 |
| | | | | 707/602 |
| 2015/0134699 | A1* | 5/2015 | Bhide | G06F 16/2272 |
| | | | | 707/781 |
| 2017/0139929 | A1 | 5/2017 | Aggarwal | |
| 2018/0181630 | A1 | 6/2018 | He | |
| 2020/0310910 | A1* | 10/2020 | Saito | G01K 13/00 |

FOREIGN PATENT DOCUMENTS

CN 108694195 A 10/2018

OTHER PUBLICATIONS

Mell et al., "The NIST Definition of Cloud Computing", Recommendations of the National Institute of Standards and Technology, Special Publication 800-145, Sep. 2011, 7 pages.

Wang et al., "Data Interface All-iN-A-place (DIANA) for Big Data", 2014 IEEE 13th International Conference on Trust, Security and Privacy in Computing and Communications, pp. 665-672, DOI 10.1109/TrustCom.2014.86, <http://researchprofiles.herts.ac.uk/portal/files/10592075/Data_Interface_All_iN_A_place_for_Big_Data.pdf>.

* cited by examiner

*Primary Examiner* — Hung T Vy
(74) *Attorney, Agent, or Firm* — David K. Mattheis; Maeve M. Carpenter

(57) ABSTRACT

Automatically extracting lineage data for distributed file systems and databases by generating a file folder including data and having a file path, generating a data table associated with the data and the file path, tracking the lineage of data into the file folder and the lineage of data from the data table, and recording an overall lineage comprising the lineage of data into the file folder and from the data table.

20 Claims, 4 Drawing Sheets

AUTOMATICALLY CAPTURING LINEAGE DATA IN DISTRIBUTED SYSTEMS

BACKGROUND

The disclosure relates generally to automatically capturing lineage in distributed computer systems. The disclosure relates particularly to automatically extracting lineage data from distributed file system information for large data sets.

Extract—transform—load (ETL) jobs are used to move data present in distributed file systems, such as HADOOP Distributed File System (HDFS) files, into database tables where the data can be searched using software such as the APACHE HIVE project. The lineage of the data from data sources through jobs and into database tables, data files, business intelligence reports and other assets can be traced. (Note: the terms "HADOOP", "APACHE", and "HIVE" may be subject to trademark rights in various jurisdictions throughout the world and are used here only in reference to the products or services properly denominated by the marks to the extent that such trademark rights may exist.)

HDFS lineage shows the upstream source ETL job which loaded the data into the HDFS. HIVE database lineage shows the downstream lineage from the HIVE table(s) to the ETL job accessing the tables. For example, where ETL job job1 loads data in the HDFS, and ETL job job2 reads data from the HIVE table, the lineage will be expressed in two parts as job1 ~>HDFS data file; HIVE table ~>job 2.

SUMMARY

Aspects of the invention disclose methods, systems and computer readable media associated with automatically extracting lineage data for distributed file systems and databases by generating a file folder including data and having a file path, generating a data table associated with the data and the file path, tracking the lineage of data into the file folder and the lineage of data from the data table, and recording an overall lineage comprising the lineage of data into the file folder and from the data table.

DETAILED DESCRIPTION

Figure 1:
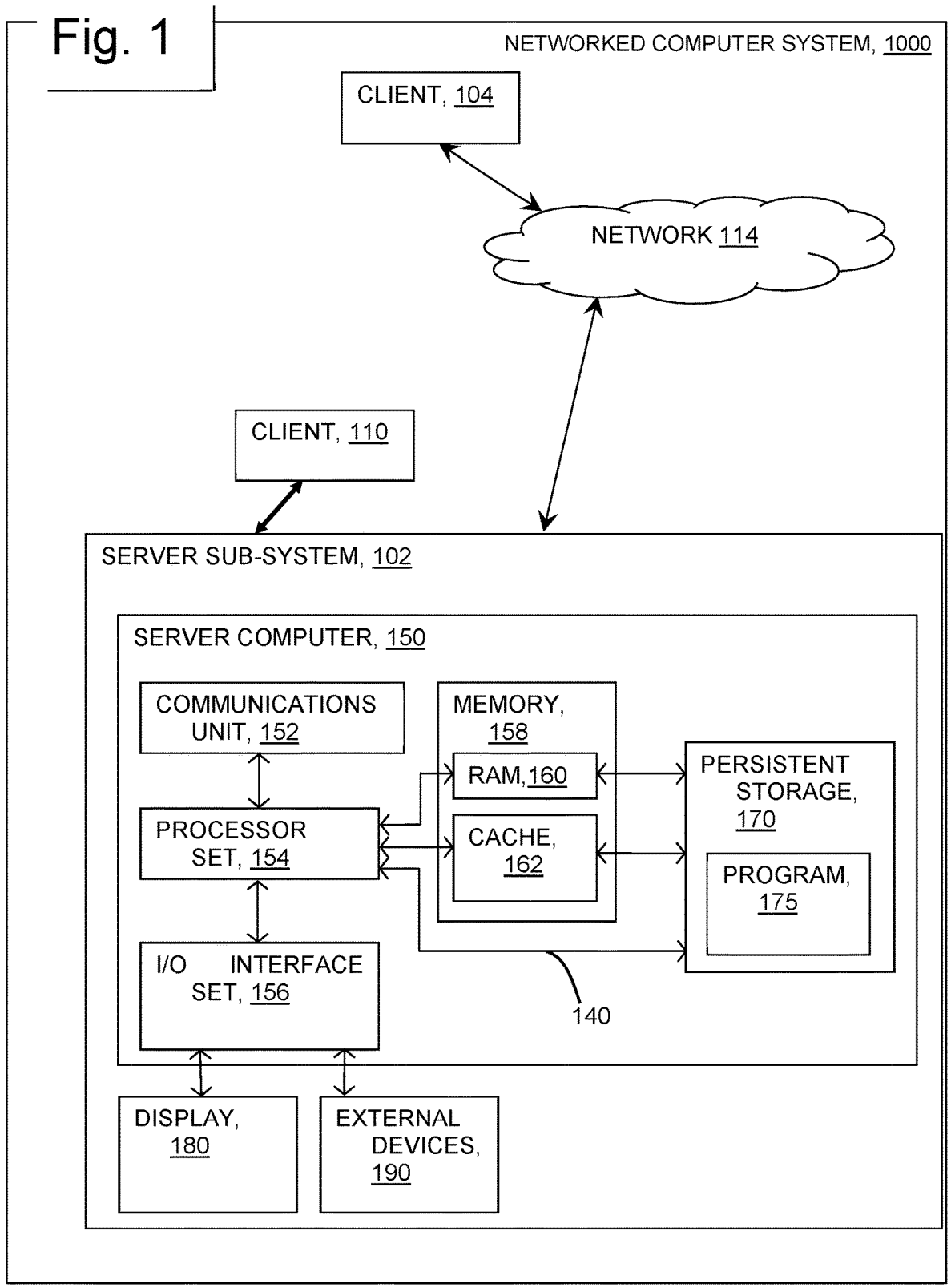
FIG. 1 provides a schematic illustration of a system, according to an embodiment of the invention.

Distributed data processing is widely used to search and transform data sets and to generate associated reports relating to the data sets and processing results. Establishing and maintaining trust in the processing results requires that the metadata regarding the lineage of the processed data be transparently documented and available. Though portions of the data lineage may be available, a complete source to output lineage is often unavailable, reducing the credibility of reports and the willingness to rely upon the reports in making business critical decisions. What is needed is a way to document the complete lineage of processed data from its source, through all processing steps to the final output of the processing.

In an embodiment, a method automatically links file folders of a data file system, such as an HDFS, to the data tables of a database, such as a HIVE database. In this embodiment, the method achieves the linking by an automatic analysis of the HDFS data file path and the HIVE database schema and table structure.

In this embodiment, the analysis of the method matches the file path data of the corresponding HDFS folder and HIVE table, tracing the lineage of the data from folder to table. The matching of the path data can be presented as a suggestion to a user or analyst and can be accepted as accurate or rejected and replaced by a lineage derived by the analyst. Acceptance of the suggested lineage can provide quicker, more efficient analysis of the processing system data flows. Rejection of the suggestion and use of the analyst's lineage is costly in terms of system performance and job time requirements.

In an embodiment, the data file folder structure parallels the database table structure. This can be accomplished by including the data file path information in the associated data table name(s).

In an embodiment, the method creates one or more file folders and an accompanying file folder structure to receive incoming data. For example, hadoop fs-mkdir/abc/default/ students can be used to create the necessary file structure.

In this embodiment, a corresponding database structure can then be created in the HIVE database using: create table if not exists students (id int, frame string, lname string) row format delimited fields terminated by '@' location '/ibm/ default/students' in an embodiment, resulting in an HDFS file structure and corresponding matching HIVE database schema table hierarchy structure in HIVE.

In an embodiment, the method tracks and records the lineage of data loaded into the HDFS files by ETL jobs, along with the data to indicate the ETL job(s) from which the data originated. The lineage metadata can be stored in the HDFS file along with the data or in a stand-alone lineage file. The lineage data can also be stored in the corresponding HIVE table, or a stand-alone HIVE lineage table. In an embodiment, the method tracks the lineage of data read from the HIVE tables by ETL or other jobs. Again, this lineage data can be stored in an HDFS file, HIVE table or both.

The method analyzes the HDFS data files and HIVE tables to find files and table having matching path information. The method concludes that files—tables having matching path information are associated in that the file provides the data for the table(s). The method presents the conclusions of the analysis to the user/data analyst. The user/ analyst either accepts the automated analysis of the lineage, or substitutes a lineage derived from their manual analysis of the processing structure.

In an embodiment, the method combines the data lineages from the input ETL job to data file, data file to data table and data table to output into a unified overall lineage for the data of the output of the processing activity. The method determines the linkages of the input—table and output data lineages according to the path data associated with the data files and data tables. In an embodiment, the method reports the overall lineage out to the user/analyst in conjunction with the data output of the processing job.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise data lineage program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the data lineage program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., data lineage program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
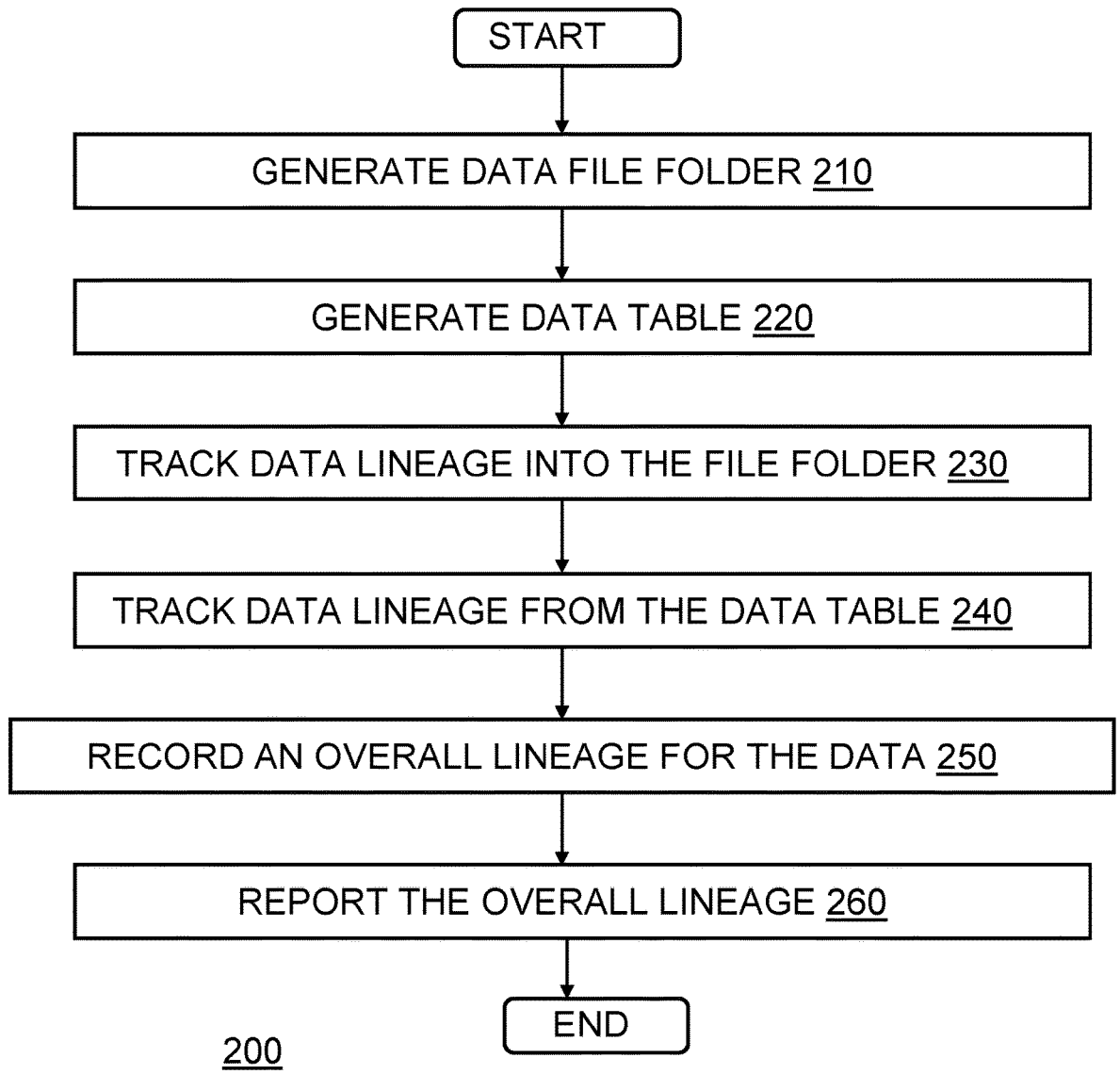
FIG. 2 provides a flowchart depicting an operational sequence, according to an embodiment of the invention.

FIG. 2 provides a flowchart 200, illustrating exemplary activities associated with the practice of the disclosure. In an embodiment, an ETL job loads data into a data file system, such as an HDFS. The disclosed methods create a file folder structure in the data file system to receive the data. The program creates a corresponding data structure in a database system table using a path criterion associated with the data file structure. The program creates one or more data tables for storing the data in a manner accessible by a database program. The method creates tables based upon the path criterion of the data structure in the database system table. As ETL jobs transfer data into the data file system, or read data from the data tables, the lineage of the data, including the ETL job(s) loading it into the data file system, the method traces and records the movement of the data from the data file system to the data table(s) and the ETL job(s) reading it from the data table(s). As shown in the figure, after program start, the data lineage program 175, generates a data file folder structure for data files at 210. The data file folder structure includes file path information for the generated files and folders. In an embodiment, the data file folder structure is an HDFS structure. At 220, the program generates data tables in a database system. In an embodiment, the program creates a data structure in a database system corresponding to the data in the data files. The generated data structure and tables include the file path information from the data file folders which are associated with the respective data tables. In an embodiment, the database system comprises an APACHE HIVE database system. At 230, the program tracks and records the lineage of data loaded into the generated file folders by one or more input ETL jobs. This lineage provides a record of the source of the data in the file folders. At 240, the program tracks and records the lineage of data from the data table in terms of ETL or other jobs reading data from the tables. In an embodiment, the program associates the lineage of the file folder data with the lineage of the data table data using the file path data of the files and corresponding tables. In an embodiment, the program records the data lineage for the input job to the file folder to the data table to output as an overall lineage for the output data from input to processed output at 250. In an embodiment, the program at 260 reports out the overall lineage of the output data from 250, to users and/or administrators, to document the data lineage of the output.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
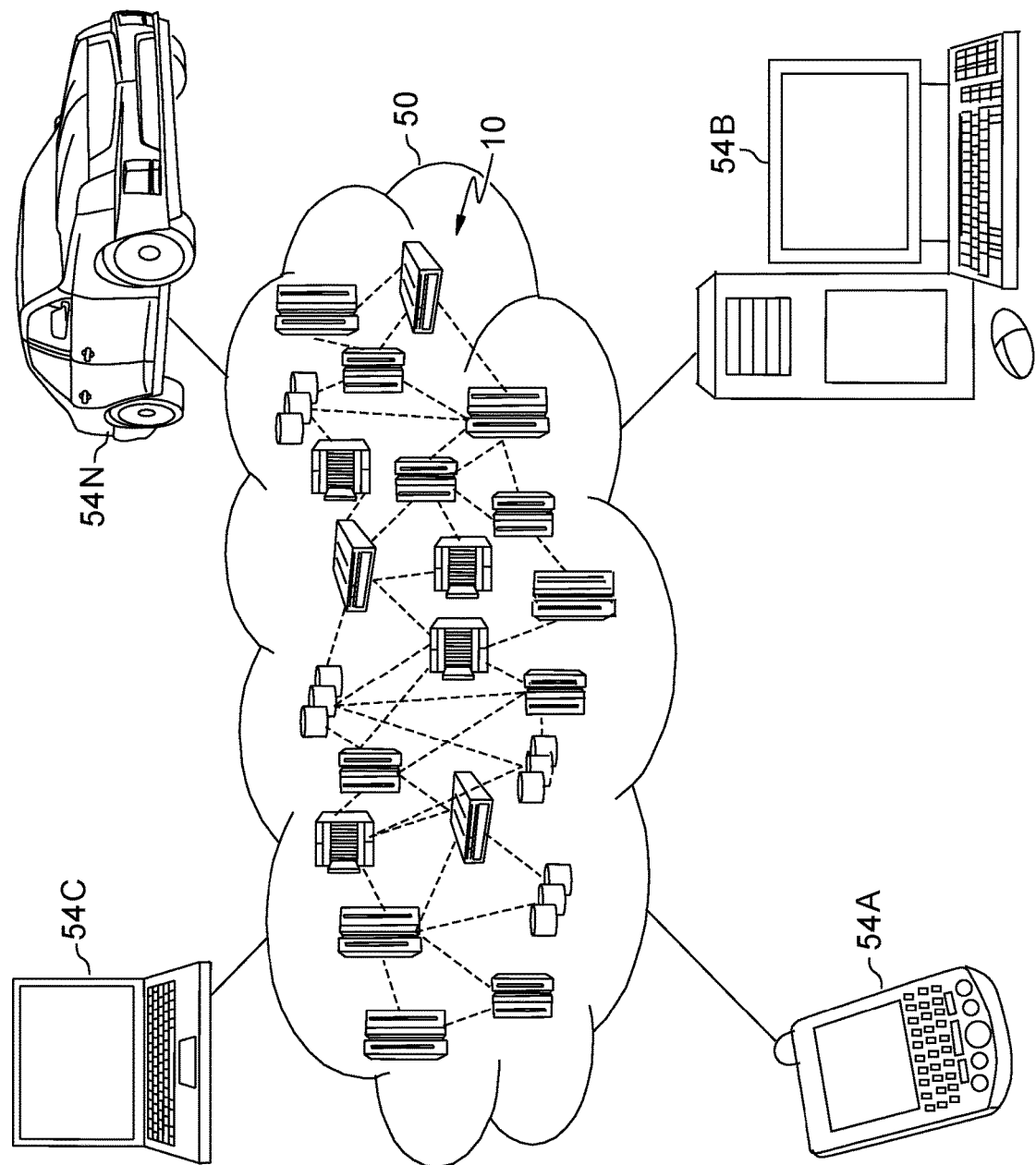
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
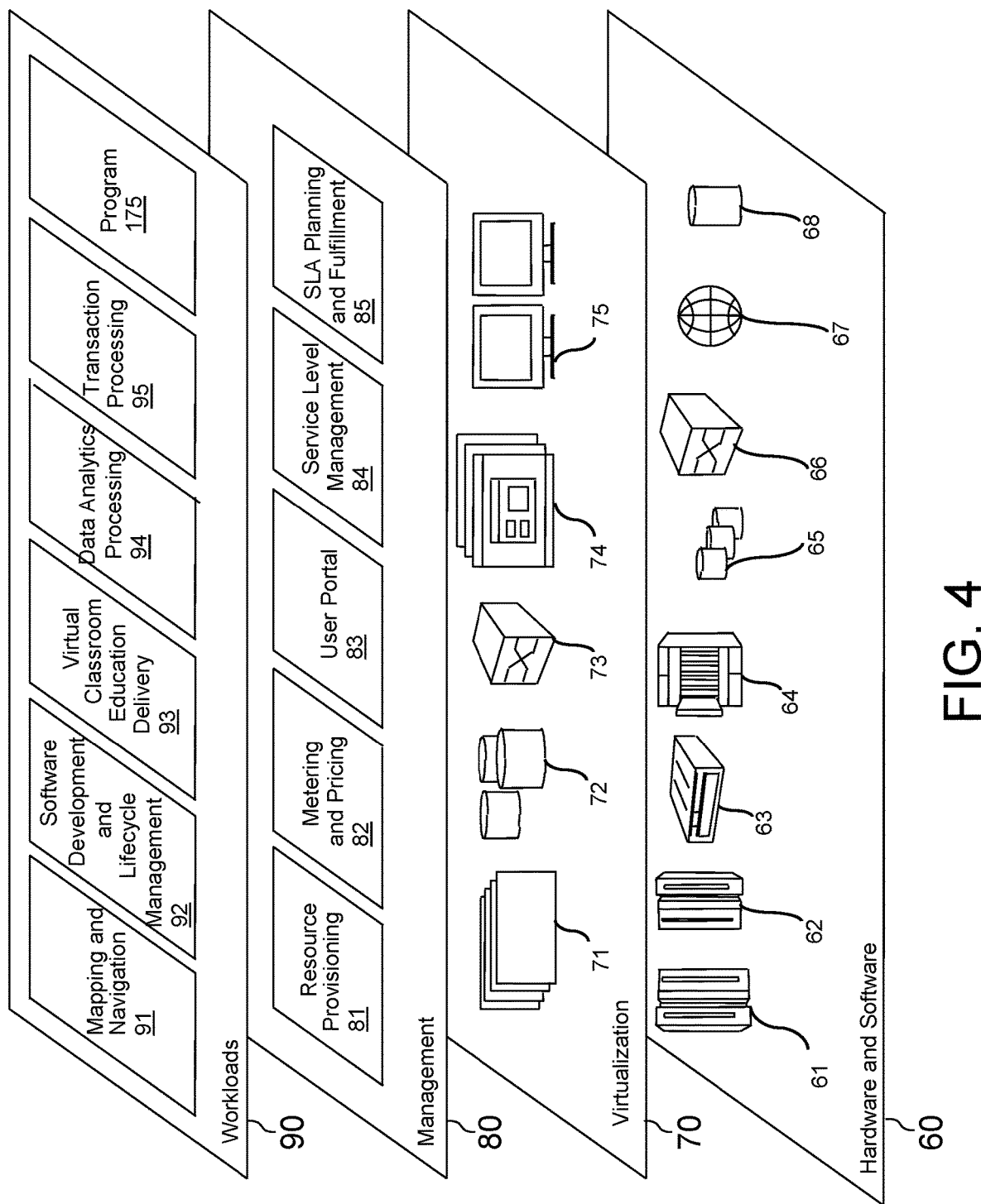
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data lineage program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for automatically extracting lineage data, the method comprising:
    generating, by one or more computer processors, a file folder, the file folder comprising data having a file path;
    storing, by the one or more computer processors, the data in a database table;
    tracking, by the one or more computer processors, the lineage of data into the file folder;
    tracking, by the one or more computer processors, the lineage of data read from the database table;
    recording, by the one or more computer processors, an overall lineage comprising the lineage of data loaded into the file folder and the lineage of data read from the database table; and
    utilizing, by the one or more computer processors, the overall lineage in conjunction with an extract—transform—load (ETL) job.

2. The computer implemented method according to claim 1, further comprising providing the overall lineage to a user.

3. The computer implemented method according to claim 1, wherein the file folder comprises a HADOOP distributed file system (HDFS) folder.

4. The computer implemented method according to claim 1, wherein the data table comprises a HIVE data table.

5. The computer implemented method according to claim 1, wherein tracking the lineage of data into the file folder comprises tracking an ETL job loading data into the file folder.

6. The computer implemented method according to claim 1, wherein tracking the lineage of data from the data table comprises tracking an ETL job reading data from the data table.

7. The computer implemented method according to claim 1, further comprising providing the overall lineage to a user, wherein the file folder comprises an HDFS folder, and the data table comprises a HIVE data table.

8. A computer program product for managing application execution, the computer program product comprising one or more computer readable storage devices and stored program instructions on the one or more computer readable storage devices, the stored program instructions comprising:
    programmed instructions to generate a file folder, the file folder comprising data having a file path;
    program instructions to store the data in a database table with the data and;
    program instructions to track a lineage of data into the file folder;
    program instructions to track a lineage of data read from the database table;
    program instructions to record an overall lineage comprising the lineage of data into the file folder and the lineage of data from the database table; and
    program instructions to utilize the overall lineage in conjunction with an extract—transform—load (ETL) job.

9. The computer program product according to claim 8, the stored program instructions further comprising program instructions to provide the overall lineage to a user.

10. The computer program product according to claim 8, wherein the file folder comprises an HDFS folder.

11. The computer program product according to claim 8, wherein the data table comprises a HIVE data table.

12. The computer program product according to claim 8, wherein tracking the lineage of data into the file folder comprises tracking an ETL job loading data into the file folder.

13. The computer program product according to claim 8, wherein tracking the lineage of data from the data comprises tracking an ETL job reading data from the data table.

14. The computer program product according to claim 8, the stored program instructions further comprising program instructions to provide the overall lineage to a user, wherein the file folder comprises an HDFS folder, and the data table comprises a HIVE data table.

15. A computer system for managing application execution, the computer system comprising:
   one or more computer processors;
   one or more computer readable storage devices; and
   stored program instructions on the one or more computer readable storage devices for execution by the one or more computer processors, the stored program instructions comprising:
      programmed instructions to generate a file folder, the file folder comprising data having a file path;
      program instructions to store the data in a database table;
      program instructions to track a lineage of data into the file folder;
      program instructions to track a lineage of data read from the database table;
      program instructions to record an overall lineage comprising the lineage of data into the file folder and the lineage of data from the database table; and
      program instructions to utilize the overall lineage in conjunction with an extract—transform—load (ETL) job.

16. The computer system according to claim 15, the stored program instructions further comprising program instructions to provide the overall lineage to a user.

17. The computer system according to claim 15, wherein the file folder comprises an HDFS folder.

18. The computer system according to claim 15, wherein the data table comprises a HIVE data table.

19. The computer system according to claim 15, wherein tracking the lineage of data into the file folder comprises tracking an ETL job loading data into the file folder.

20. The computer system according to claim 15, wherein tracking the lineage of data from the data comprises tracking an ETL job reading data from the data table.

* * * * *